United States Patent
Vasudevan et al.

(10) Patent No.: US 9,137,420 B1
(45) Date of Patent: Sep. 15, 2015

(54) SERVICE-ORIENTED MULTIFUNCTION DEVICES

(71) Applicant: Xerox Corporation, Norwalk, CT (US)

(72) Inventors: KishoreKumar Manikkoth Vasudevan, Chennai (IN); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/254,986

(22) Filed: Apr. 17, 2014

(51) Int. Cl.
| | |
|---|---|
| *G06F 3/12* | (2006.01) |
| *H04N 1/44* | (2006.01) |
| *H04N 1/00* | (2006.01) |
| *H04N 1/32* | (2006.01) |

(52) U.S. Cl.
CPC ........... *H04N 1/444* (2013.01); *H04N 1/00209* (2013.01); *H04N 1/32272* (2013.01); *H04N 1/442* (2013.01); *H04N 1/4413* (2013.01); *H04N 1/4486* (2013.01); *H04N 2201/0075* (2013.01); *H04N 2201/0094* (2013.01); *H04N 2201/3205* (2013.01); *H04N 2201/3281* (2013.01)

(58) Field of Classification Search
None
See application file for complete search history.

(56) References Cited

U.S. PATENT DOCUMENTS

| | | | |
|---|---|---|---|
| 2012/0176651 A1* | 7/2012 | Pham et al. | 358/3.28 |
| 2013/0046991 A1 | 2/2013 | Lu et al. | |
| 2013/0159720 A1 | 6/2013 | Gonser et al. | |
| 2014/0084071 A1* | 3/2014 | Einman et al. | 235/492 |

FOREIGN PATENT DOCUMENTS

| CA | 2731116 A1 | 1/2009 |
|---|---|---|

* cited by examiner

*Primary Examiner* — Marcus T Riley

(57) ABSTRACT

The present disclosure provides systems and methods for operating a multifunction device in communication with multiple devices. The multifunction device is configured to receive an operation request and an electronic document from a first device. The multifunction device is further configured to receive document manipulation data from a second device. The multifunction device is also configured to manipulate the electronic document using the document manipulation data based on the operation request. The multifunction device communicates the manipulated electronic document to a third device. The second device is isolated from the third device and the first device.

20 Claims, 4 Drawing Sheets

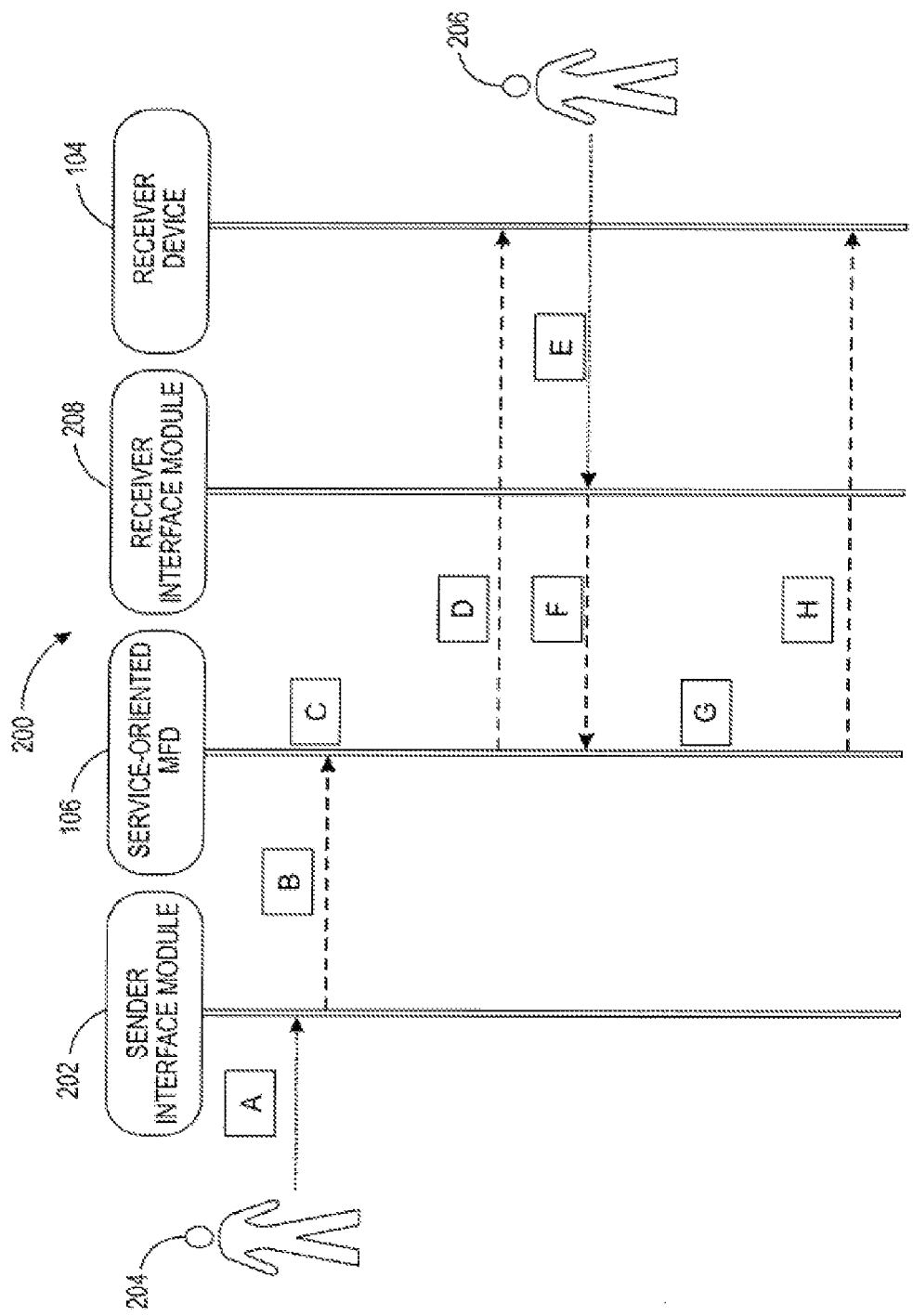

SERVICE-ORIENTED MULTIFUNCTION DEVICES

TECHNICAL FIELD

The presently disclosed subject matter relates to multifunction devices, and more particularly to multifunction devices providing document management services.

BACKGROUND

Business workflows may require that a certain document be accessed or manipulated by multiple users. One workflow involves encryption or decryption of the document by a cryptographic application to maintain confidentiality and security of document data. The cryptographic application may be installed on one or more end devices for each user, thereby increasing infrastructure and maintenance costs for the cryptographic application. Another workflow involves embedding one or more electronic signatures in the document by a signing application. The document is often shared with different users, for example, via an email, for embedding multiple signatures in the document. However, the confidentiality of the document is compromised if the document is erroneously or inadvertently sent to an unintended recipient.

SUMMARY

It may therefore be beneficial to provide a robust and/or economical approach to enhance security and/or confidentiality of documents, such as, in a multi-user environment.

One exemplary embodiment includes a system for manipulating an electronic document. The system is for use with multiple user devices. The system includes a multifunction device, an input device, and a user device. The input device is configured to communicate document manipulation data to the multifunction device. The user device is configured to communicate an operation request and an electronic document to the multifunction device. The user device is not in communication with the input device. The multifunction device is configured to receive the operation request, the electronic document and the document manipulation data. The multifunction device is further configured to manipulate the electronic document using the document manipulation data based on the operation request.

Another exemplary embodiment includes a method for operating a multifunction device in communication with multiple devices. The method includes receiving an operation request and an electronic document from a first device. The method also includes receiving document manipulation data from a second device. The method further includes manipulating the electronic document using the document manipulation data based on the operation request. The method furthermore includes communicating the manipulated electronic document to a third device. The second device is isolated from the third device and the first device.

Other and further aspects and features of the disclosure will be evident from reading the following detailed description of the embodiments, which are intended to illustrate, not limit, the present disclosure.

BRIEF DESCRIPTION OF THE DRAWINGS

FIG. 2A is a schematic that illustrates an exemplary workflow for encrypting and decrypting an electronic document using the service-oriented multifunction device of FIG. 1;

DETAILED DESCRIPTION

Figure 1:
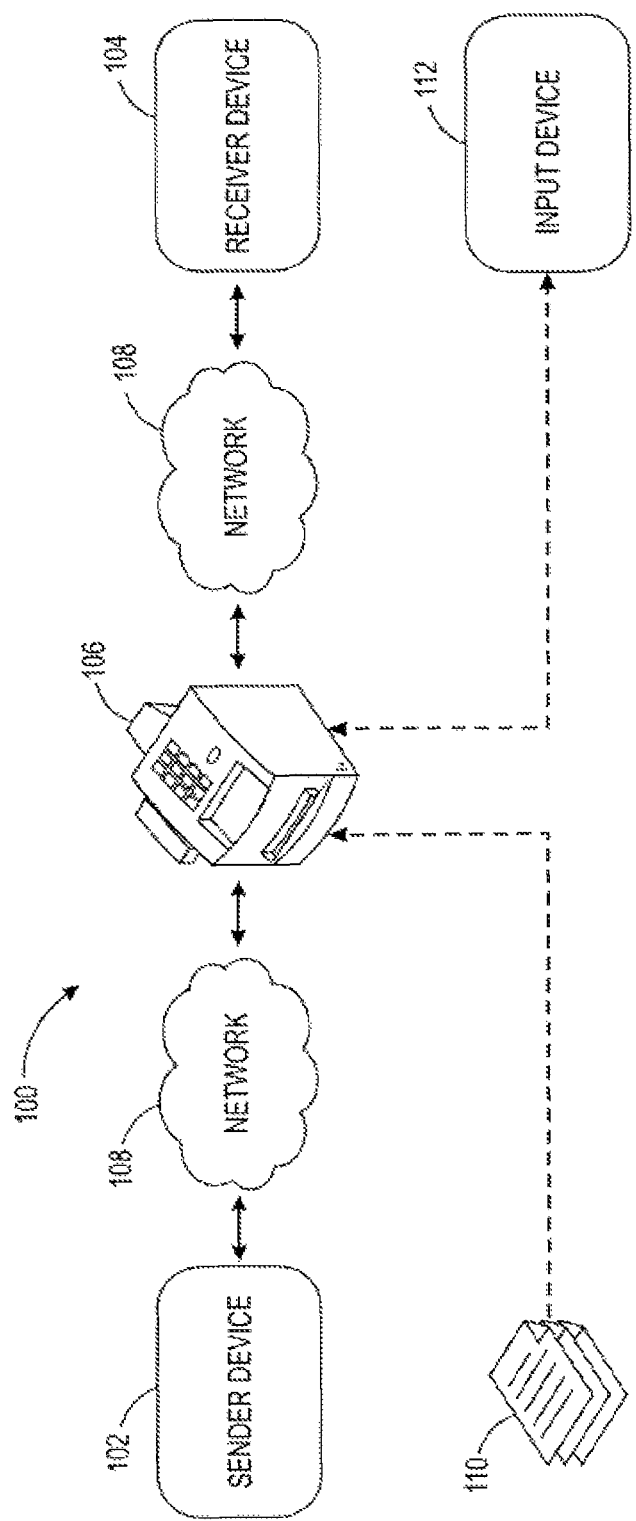
FIG. 1 is a schematic that illustrates a network environment including an exemplary service-oriented multifunction device, according to an embodiment of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

NON-LIMITING DEFINITIONS

In various embodiments of the present disclosure, definitions of one or more terms that will be used in the document are provided below.

A "document" is a written record having a single page or multiple pages. Each page may include data such as text, images, multimedia content, biometric content, or a combination thereof. The document may refer to a physical document or an electronic document without any limitation.

A "user" is an individual or an entity who communicates with one or more modules loaded or integrated with an electronic device capable of or configured to perform a specific function. The entity may include organizations such as professional services organizations, product manufacturing organizations, finance management organizations, real estate organizations, and so on that deal with one or more documents.

A "user device" is used in the present disclosure in the context of its broadest definition. The user device may refer to a networked computing device capable of handling electronic documents, and may host various applications to request services from other devices connected to the network. Various examples of the user device include a desktop PC, a personal digital assistant (PDA), a server, a mainframe computer, a mobile computing device (e.g., mobile phones, laptops, etc.), an internet appliance, etc.

A "workflow" refers to a set of activities generally performed by the user independently or in association with one or more computing devices to avail, customize, or offer different products or services. For example, a workflow for visa services may involve filling out forms, submitting one or more documents, making an appointment, etc.

"Document manipulation data" is used in the present disclosure in the context of its broadest definition. The document manipulation data refers to data that modifies content or workflows associated with the document.

A "multifunction device" includes a single device that performs traditionally multiple separate functionalities, such as printing, scanning, copying, and faxing the document. The multifunction device may participate in a network and communicate with various devices, users, entities, or any combination thereof.

An "operation request" is used in the present disclosure in the context of its broadest definition. The operation request refers to a request directed to execution or initiation of a specific task.

The numerous references in the disclosure to a service-oriented multifunction device are intended to cover any and/or all devices capable of performing respective operations on the person in a customer-interacting environment relevant to the applicable context, regardless of whether or not the same are specifically provided.

Overview

A first aspect of the present disclosure focuses on simplifying the process of executing documents transmitted electronically. In the related art, a user receives an electronic document, prints the document, executes the document, scans the document, and then encrypts the scanned document and sends it to a recipient, which requires multiple steps and is therefore cumbersome. The inventive concept involves the user selecting a certain mode (e.g., document approval and forward option) on an end device via a user interface, such that the mode is pursuant to a print command; the document is then held at a multifunction device (without printing), enabling the user to go to the multifunction device, authenticate the user's identity, and pull the document from a queue, (e.g., print queue) at the multifunction device. The user can access the pulled document and select the page for execution. The user can then either electronically apply the signature to the document, or execute the document on the screen of the multifunction device using a stylus pen.

A second aspect of the present disclosure focuses on simplifying encryption/decryption, such as by enhancing the related art techniques involving authenticated software and card readers. The inventive concept provides a multifunction device with an encryption/decryption feature. Software is used to submit a document with a key and a type of encryption/decryption that the user wants to use. The multifunction device performs the encryption/decryption based on the request, and sends the document to its destination. This operation can be performed in two ways. First, the user submits the job with the key and algorithm to the multi-function device using an encrypted protocol, and the multi-function device would perform the encryption/decryption accordingly. Alternatively, the document is submitted to the multifunction device, and the user selects an option where the key is to be taken from the user's smart card. Similarly to the first aspect, the document is held at the multifunction device and particularly, held until the user goes to the multifunction device and enters a pin. The user then needs to flash the user's smart card at the reader, and the multifunction device uses the key stored in the smart card to encrypt the document, and the encrypted document is then sent to its destination. When the encrypted document is to be decrypted, the encrypted document is sent to the multifunction device for decryption using a predefined or user-specified decryption key and decryption algorithm.

Exemplary Embodiments

FIG. 1 is a schematic that illustrates a network environment including an exemplary service-oriented multifunction device, according to an embodiment of the present disclosure. A network environment 100 may include a sender device 102 and a receiver device 104, both configured to communicate with each other via a service-oriented multifunction device 106 (SMD 106) over a network 108. The network 108 may be a wireless or a wired network, or a combination thereof. The network 108 may be a collection of individual networks, interconnected with each other and functioning as a single large network (e.g., the Internet or an intranet). Examples of the network 108 include, but are not limited to, local area network (LAN), wide area network (WAN), cable/telephone network, satellite network, and so on. Each of the sender device 102 and the receiver device 104 may refer to a user device implemented as any of a variety of computing devices, including, for example, a server, a desktop PC, a notebook, a workstation, a personal digital assistant (PDA), a mainframe computer, a mobile computing device, an internet appliance, and so on.

In one embodiment, each of the sender device 102 and the receiver device 104 may include an interface module (not shown), such as a client application, a device driver (e.g., a print driver), etc., which integrates at least one of the sender device 102 and the receiver device 104 with the SMD workflows, for example, a scan workflow, a print workflow, a fax workflow, etc. The sender device 102 or the receiver device 104 may submit one or more electronic documents to the SMD 106 using the interface module over the network 108 for performing intended operation on the electronic documents. In another embodiment, the SMD 106 may be configured to scan physical documents 110 for converting them into electronic documents, which may be stored at the SMD 106.

Embodiments of the SMD 106 are configured to provide various operations as services to a wide variety of devices, such as the sender device 102 and the receiver device 104, connected to the network 108. Examples of these operations include encrypting the electronic documents, decrypting the electronic documents that are encrypted, and embedding one or more digital signatures on the electronic documents. The SMD 106 may be implemented as a standalone and dedicated "black box" including hardware and installed software, where the hardware is closely matched to the requirements and/or functionality of the software. The SMD 106 may enhance or increase the functionality and/or capacity of the network 108 to which it is connected. The SMD 106 may be configured, for example, to perform e-mail tasks, security tasks, network management tasks including IP address management, and other tasks. In some embodiments, the SMD 106 is configured to expose its operating system or operating code to an end user, and may include related art I/O devices, such as a keyboard or display. The SMD 106 of some embodiments may, however, include software, firmware or other resources that support remote administration and/or maintenance of the SMD 106.

The SMD 106 may be configured to communicate with one or more input devices, such as an input device 112. Examples of the input device 112 include, but are not limited to, a smartcard, a microphone, a stylus pen, a keyboard, a camera, etc. The SMD 106 may communicate with the input device 112 through various interfaces including software interfaces, for example, an application programming interface, a graphical user interface (GUI), etc.; hardware interfaces, for example, cable connectors, a biometric scanner, a card reader, an interactive display screen, a scanning platen, etc.; or both. The interface(s) may facilitate (1) receiving the electronic documents, user identification data (e.g., PIN), and document manipulation data (e.g., a unique private key, a digital signature, etc.), (2) converting the physical documents 110 into electronic documents, and (3) transmitting manipulated documents to at least one of the sender device 102 or the receiver device 104.

In one embodiment, the SMD 106 may be configured to receive the document manipulation data from the input device 112, which may be used in association with another input device for interacting with the SMD 106 via the SMD interfaces. For example, a smartcard or a stylus pen may be used in association with another input device such as a keyboard for entering a personal identification number (PIN) to authenticate the smartcard (or the stylus) or a corresponding user to the SMD 106.

The SMD 106 may be configured to operate with at least one processor (not shown) executing machine readable program instructions for implementing cryptographic algorithms and digital signatures as a service for manipulating the electronic documents. The processor may include, for example, microprocessors, microcomputers, microcontrollers, digital signal processors, central processing units, state machines, logic circuits, and/or any devices that manipulate signals based on operational instructions. Among other capabilities, the processor is configured to fetch and execute computer readable instructions in the memory (not shown) of SMD 106 or other devices connected to the SMD 106.

The SMD 106 may include, in whole or in part, a software application working alone or in conjunction with one or more hardware resources. Such software applications may be executed by the processor on different hardware platforms or emulated in a virtual environment. Aspects of the SMD 106 may leverage off-the-shelf software available in the art, related art, or developed later.

The SMD 106 may be configured to store different types of data (such as the document manipulation data) for manipulating the electronic documents. The SMD 106 may also store the electronic documents at least until the electronic documents are manipulated based on an operation request. The SMD 106 may communicate with a storage server, for example, a file server used in a network-attached-storage (NAS) mode, a block-based storage server such as used in a storage area network (SAN), or other type of storage server for storing at least one of the document manipulation data and the electronic documents. Examples of the document manipulation data include, but are not limited to, digital signatures, cryptographic algorithms, cryptographic keys, and other relevant data that may be used for manipulating the electronic documents. Optionally, the digital signatures may include metadata, such as a hash value, to perform user authentication and maintain document integrity. Cryptographic algorithms may include various encryption/decryption algorithms and digital signature algorithms, for example, data encryption standard (DES), advanced encryption standard (AES), SHA3-512, ANSI X9.31, Triple-DES, international data encryption algorithm (IDEA), RSA, ElGamal, secure hashing algorithms (e.g., MD5, FIPS 186-4, FIPS 180-2), or any other known in the art, related art, or later developed algorithms. The digital signatures may include an image, a text, a multimedia content, biometric data, or a combination thereof.

The SMD 106 may also be configured to receive the electronic documents and the document manipulation data for manipulating the received electronic documents based on an operation request that may be received via various channels. In a first example, the SMD 106 may receive the operation request, such as for encrypting the electronic document, through a user interface associated with the SMD 106. In a second example, the SMD 106 may receive the operation request from at least one of the sender device 102, the receiver device 104, or the input device 112 such as a smartcard. In a third example, the SMD 106 may be preconfigured with the operation request to perform a predefined operation on the received electronic documents.

In one embodiment, the SMD 106 may receive (1) the electronic documents from at least one of the sender device 102 and the receiver device 104 and (2) the document manipulation data such as a unique private key and the digital signature from the input device 112. The unique private key may include numeric data, alphanumeric data, special characters, an audio signal, a video signal, biometric data, or any combination thereof. In some embodiments, the unique private key may be generated by the SMD processor based on inputs received via the input device 112. Examples of such inputs include, but are not limited to, content type of the received electronic document, content size of the electronic document, an audio signal (for e.g., a user voice), a video signal (e.g., a user video), a biometric signal (e.g., a user fingerprint), or any combination thereof. In some embodiments, the digital signature may be received the SMD 106 using the stylus pen via the user interface of the SMD 106. However, other embodiments may involve the SMD 106 retrieving a stored digital signature after user authentication is performed based on the received unique private key.

The SMD 106 may be configured to perform at least one of the following operations, namely, encrypt the electronic documents, decrypt the electronic documents that are encrypted, and embed the digital signature on the electronic documents using the unique private key based on a cryptographic algorithm such as those mentioned above. In one example, the user may select the electronic document and the cryptographic algorithm stored in the SMD 106; send the operation request to the SMD 106 for encrypting the selected electronic document; and provide the unique private key. Based on the operation request, the SMD 106 may access the selected electronic document and encrypt it using the received unique private key according to the selected cryptographic algorithm to generate an encrypted electronic document. Other examples may involve the SMD 106 generating manipulated electronic documents including at least one of the encrypted electronic documents, the decrypted electronic documents, and the signed electronic documents embedded with one or more digital signatures in a multi-user environment, based on the operation request. In some embodiments, the SMD 106 may be configured to store the manipulated documents until an operation request is received for a next operation to be performed on the manipulated documents. However, other embodiments may involve the SMD 106 being configured to automatically transmit the manipulated documents to the receiver device 104 over the network 108. For this, the SMD 106 may receive a destination address, for example, an email address, IP address, a uniform resource locator (URL) address, etc. corresponding to the receiver device 104 for transmitting the manipulated documents to that address. The destination address may be received from the sender device 102 or the input device 112 (e.g., a smartcard), or directly at the SMD 106 via the associated user interfaces. Optionally, the destination address may be predefined in the SMD 106.

Figure 2B:
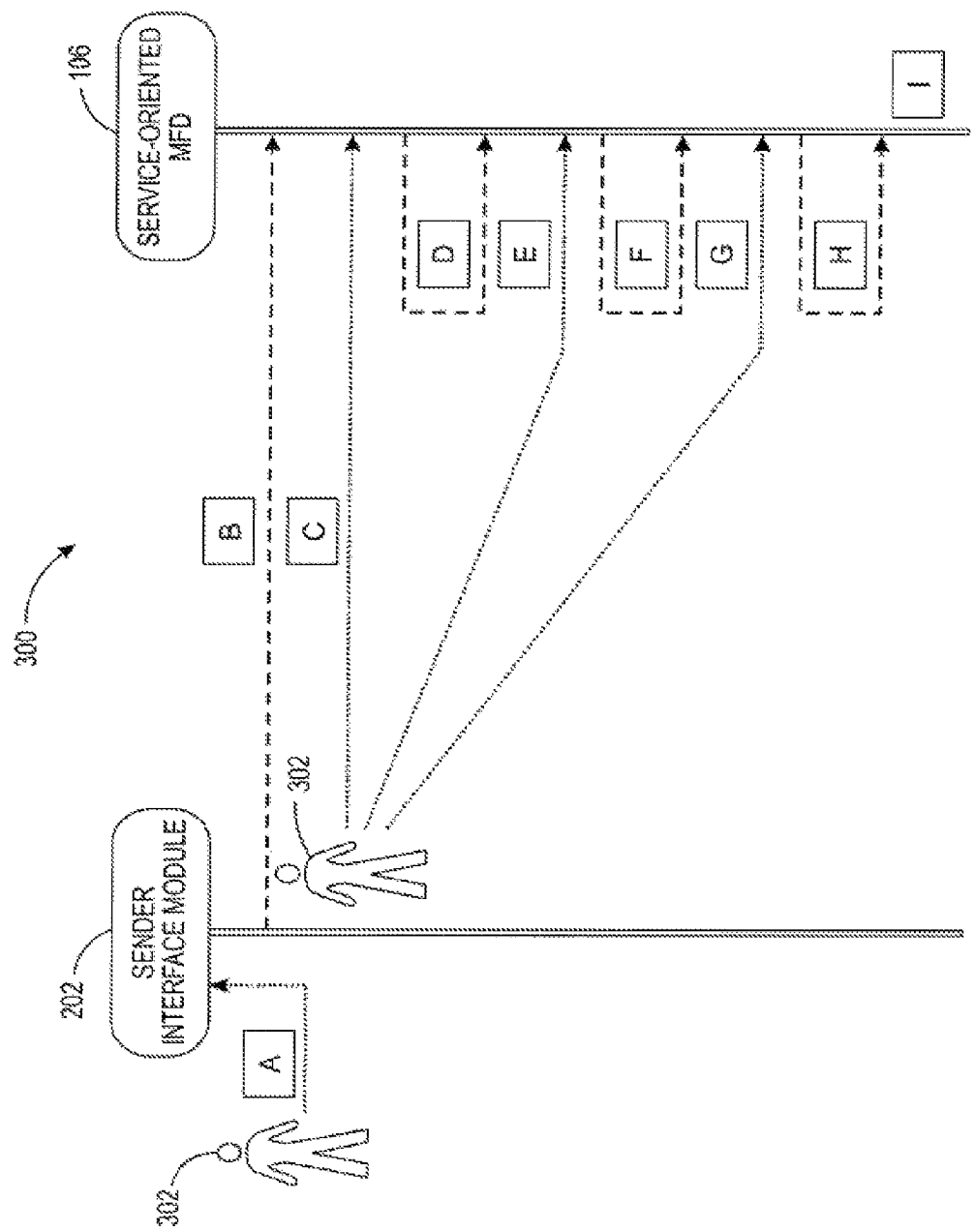
FIG. 2B is a schematic that illustrates a first exemplary workflow for embedding a digital signature on an electronic document using the service-oriented multifunction device of FIG. 1.
Figure 2C:
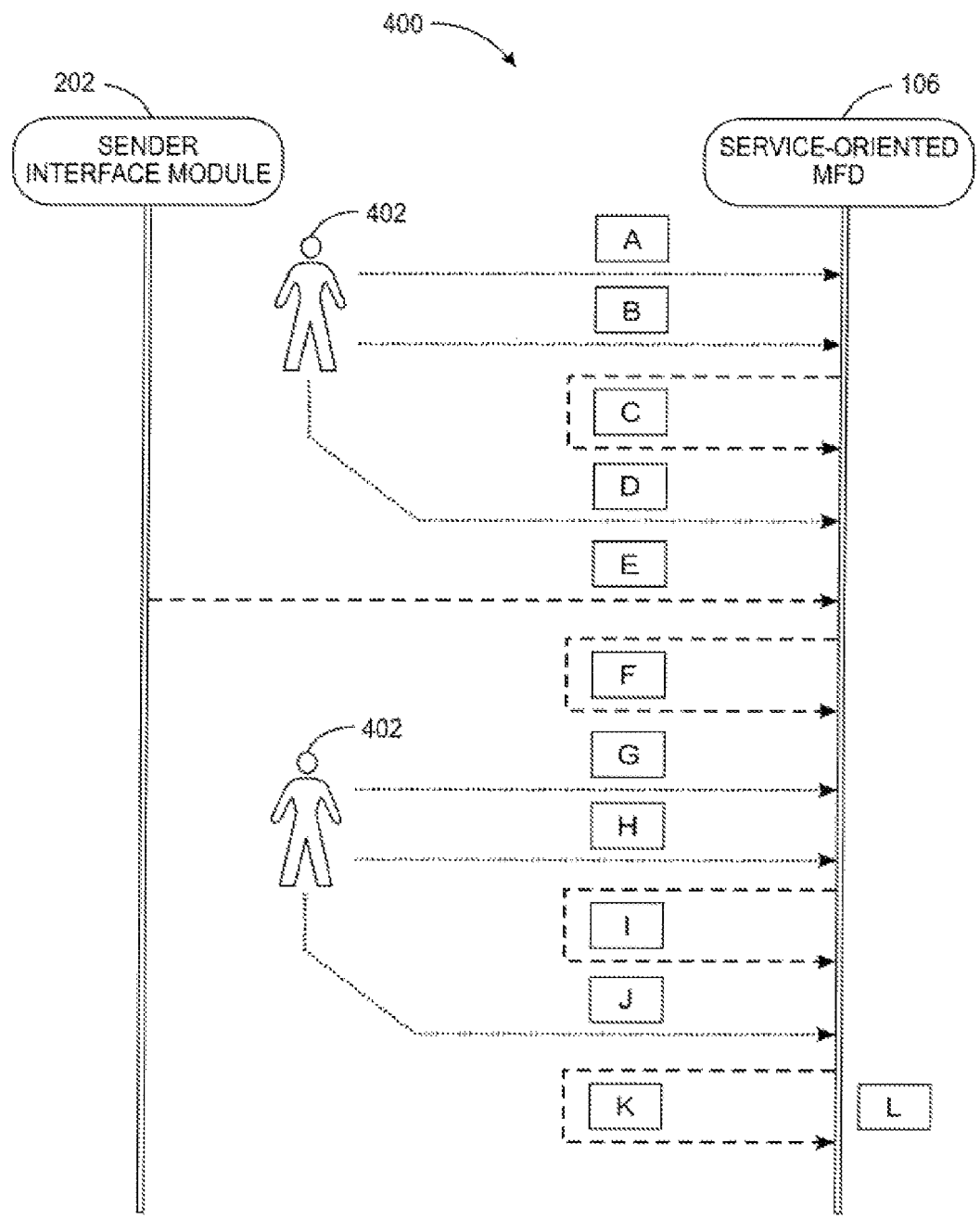
FIG. 2C is a schematic that illustrates a second exemplary workflow for embedding a digital signature on an electronic document using the service-oriented multifunction device of FIG. 1.

FIGS. 2A-2C are schematics that illustrate exemplary workflows for manipulating electronic documents using the SMD 106 of FIG. 1. The exemplary workflows may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium, and installed or embedded in an appropriate device for execution.

The order in which the workflows are described is not intended to be construed as a limitation, and any number of the described workflow steps can be combined or otherwise performed in any order to implement the workflows, or alternate workflows. Additionally, individual steps may be deleted from the workflows without departing from the spirit and scope of the present disclosure described herein. Furthermore, the workflows can be implemented in any suitable hardware, software, firmware, or combination thereof, that exists in the related art or that is later developed.

The workflows describe, without limitation, implementation of the multifunction device as an exemplary service provider in a network environment. One of ordinary skill in the art will understand that the workflows may be modified appropriately for implementation in a variety of various business scenarios including those related to medical services, hospitality, retail, banking services, and so on, without departing from the scope and spirit of the disclosure.

FIG. 2A is a schematic that illustrates an exemplary workflow 200 for encrypting and decrypting an electronic document using the SMD 106 of FIG. 1. As shown, steps A-D refer to a workflow for encrypting the electronic document using the SMD 106. At step A, an operation request, an electronic document, and document manipulation data are received. The sender device 102 may include a sender interface module 202 configured to communicate with the SMD 106 over the network 108. Examples of the sender interface module 202 (s-module 202) may include a client application, a device driver such as a print driver, etc. The s-module 202 may be any known in the art, related art, or later developed computer program that is compatible with hardware and software resources of the sender device 102 and establishes communication with the SMD 106. The s-module 202 may be configured to integrate the sender device 102 with at least one of the SMD workflows such as a print workflow, a scan workflow, etc.

In a first embodiment, a first user 204 may interact with the sender device 102 for submitting an electronic document and an operation request for encrypting the electronic document to the s-module 202. In a second embodiment, the first user 204 may scan the physical documents 110 by the SMD 106 for converting them into electronic documents, which are stored in the SMD 106; however, the first user 204 may submit the operation request to the s-module 202 at the sender device 102 via a suitable interface such as those mentioned above. The s-module 202 may also receive the document manipulation data including: (1) a destination address, (2) an instance of the encryption key to be used for encrypting a selected electronic document, and a unique encryption key at the SMD 106 from the first user 204. In some embodiments, the first user 204 may submit the document manipulation data directly to the SMD 106 using the input device 112 such as those mentioned above.

At step B, the s-module 202 at the sender device 102 may transmit the electronic document, the operation request, and the document manipulation data to the SMD 106. In some embodiments, the s-module 202 may be configured to intermediately encrypt the electronic document using various encryption protocols known in the art, related art, or later developed for maintaining security of the electronic document during transmission to the SMD 106 over the network 108.

At step C, the SMD 106 receives the electronic document, the operation request, and the document manipulation data from at least one of the sender device 102 and the input device 112. The SMD 106 may be configured to encrypt the received electronic document based on the encryption algorithm that may be specified by the first user 204 in the document manipulation data. The SMD 106 retrieves the specified encryption algorithm from the stored cryptographic algorithms and employs it to encrypt the electronic document using the received encryption key for generating an encrypted electronic document. Some embodiments in which the SMD 106 receives the intermediately encrypted electronic document, the SMD 106 may be configured to decrypt the electronic document before encrypting the electronic document based on the user-specified encryption algorithm.

At step D, the encrypted electronic document is sent to the receiver device 104. The SMD 106 may be configured to send the encrypted electronic document to the destination address corresponding to the receiver device 104. The destination address may be received by the SMD 106 from the sender device 102 via the s-module 202, or from the input device 112, such as the smartcard, directly at the SMD 106. The SMD 106 may transmit the encrypted electronic document, for example, as an email attachment, to the receiver device 104 over the network 108.

Steps E to H refer to a workflow for decrypting the encrypted electronic document using the SMD 106. At step E, a second user 206 may submit an operation request, the encrypted electronic document, and document manipulation data to the receiver device 104. In this case, the document manipulation data may include, but are not limited to, a decryption key, a decryption algorithm, and a destination address. The receiver device 104 may include a receiver interface module 208 (r-module 208), e.g., a client application, a print driver, etc., which may be similar to the s-module 202. The r-module 208 may be configured to communicate with the SMD 106 over the network 108, and integrate the receiver device 104 with the SMD workflows such as a print workflow, a scan workflow, etc.

In one embodiment, the second user 206 may interact with the receiver device 104 for submitting the encrypted electronic document and the operation request for decrypting the encrypted electronic document to the r-module 208. Additionally, the second user 206 may submit at least one of the document manipulation data, namely: (1) the destination address, (2) an instance of the decryption algorithm to be used for decrypting the encrypted electronic document, and (3) a unique decryption key to the r-module 208. In another embodiment, the second user 206 may submit the document manipulation data directly to the SMD 106 using the input device 112 such as those mentioned above associated with the SMD 106.

At step F, the r-module 208 transmits the encrypted electronic document, the operation request, and the document manipulation data to the SMD 106 over the network 108. At step G, the SMD 106 receives the encrypted electronic document, the operation request, and the document manipulation data from at least one of the receiver device 104 and the input device 112. The SMD 106 is configured to decrypt the received encrypted electronic document based on the decryption algorithm specified in the received document manipulation data. The SMD 106 retrieves the specified decryption algorithm from the stored cryptographic algorithms and applies the retrieved algorithm to the encrypted electronic document using the received decryption key for decryption to generate a decrypted electronic document.

At step H, the decrypted electronic document is sent to the receiver device 104. The SMD 106 is configured to send the decrypted electronic document to the destination address corresponding to the receiver device 104 or any other device connected to the network 108. The destination address may be received by the SMD 106 from the receiver device 104 via the r-module 208, or from the input device 112 such as the smartcard directly at the SMD 106. Some embodiments may include the destination address being preconfigured into the SMD 106. The SMD 106 may transmit the decrypted electronic document, for example, as an email attachment, to the destination address over the network 108.

FIG. 2B is a schematic that illustrates a first exemplary workflow 300 for embedding a digital signature on an electronic document using the SMD 106 of FIG. 1. At step A, a user 302 may interact with the sender device 102 to select an electronic document on which one or more digital signatures are to be placed. The selected electronic document may be submitted to the s-module 202 for transmitting the electronic document to the SMD 106. At step B, the s-module 202 may submit the electronic document to the SMD 106 over the network 108. At the SMD 106, the electronic document may be stored until the user 302 triggers the SMD 106 to manipulate the stored electronic document. At step C, the user 302 may access the stored electronic document at the SMD 106 via a suitable user interface (not shown). At step D, the user 302 may select the stored electronic document at the SMD 106 for placing the digital signature on the electronic document. At step E, the user 302 may access or select a page and a position on the electronic document where the digital signature is to be placed. The user 302 may then use the stylus pen to sign on the selected page and position of the electronic document via the user interface.

At step F, the SMD 106 may create a digital image of the entered user signature and place that digital signature along with a digital image at the selected page and position on the electronic document. The digital signature is placed based on a preselected or dynamically selected digital signature algorithm that is stored in the SMD 106. The SMD 106 is configured to apply a predefined or the selected digital signature algorithm for embedding the digital signature on the electronic document and generate a signed electronic document. At step G, the user 302 may operate the input device 112 to communicate with the SMD 106 via an interface at the SMD 105, for example, the user 302 may swipe a smartcard against a card reader at the SMD 106. The input device 112 may store document manipulation data such as a unique private key and a reference to the encryption algorithm that are to be used and selected respectively for encrypting the signed electronic document. At step H, the SMD 106 may encrypt the signed electronic document using the unique private key based on the encryption algorithm referred in the input device 112 to generate an encrypted signed document. At step I, the SMD 106 may transmit the encrypted signed document to the destination address corresponding to the receiver device 104 or any other device connected to the network 108. The destination address may be received by the SMD 106 from at least one of the sender device 102, the input device 112, and the user 302 entering the destination address directly at the SMD 106 via the user interface. Steps A-G may be repeated with multiple users for embedding multiple digital signatures on the electronic document at the SMD 106 without needing to print the electronic document; however, the SMD 106 may be configured to perform the steps H and I optionally.

FIG. 2C is a schematic that illustrates a second exemplary workflow 400 for embedding a digital signature on an electronic document using the SMD 106 of FIG. 1. The second exemplary workflow 400 may involve enrollment of the digital signature in steps A to D and signature embedding on the electronic document in steps E to L at the SMD 106 using the enrolled signature. At step A, a user 402 may fill or complete a predefined signature enrollment form (not shown), which may be stored in and printed by the SMD 106 to obtain a physical copy of the signature enrollment form. The form may include various fields including at least one field for registering a signature of the user 402. Other examples of fields may include, but are not limited to, biometric field (such as, for registering a fingerprint), a code field (such as, for registering a barcode), etc. At step B, the user 402 signs the physical copy of the signature enrollment form against a signature field and submits the signed form to the SMD 106.

The SMD 106 may scan the form using a suitable scanner including, but are not limited to, an optical scanner, an infrared scanner, etc. to generate an electronic copy of the form (hereinafter referred to as electronic form) at the SMD 106. The electronic form may be stored at the SMD 106.

At step C, the SMD 106 scans the electronic form for pre-scan data, including, but not limited to, the signature of the user 402, a barcode, etc. that are filled-up in various fields of the electronic form by the user 402. The SMD 106 is configured to extract the filled-up signature from the scanned electronic form and to convert the signature, or other pre-scan data, into a digital image of the signature (hereinafter referred to as a digital signature). The SMD 106 may be further configured to use the scanned pre-scan data for generating binary data that may be used for generating a hash value for the digital signature. At step D, the SMD 106 is configured to associate the generated hash value with the digital signature, and stores both of them together in a secure folder located at the SMD 106 or an associated storage server including those mentioned above. The secure folder may be accessed by the user 402 via a secure PIN, or other data stored in the input device 112 such as the smartcard. At step E, the user 402 may select an electronic document at the sender device 102 for embedding one or more digital signatures on the selected electronic document, which may be submitted to the s-module 202 for being transmitted to the SMD 106.

At step F, the electronic document is received and stored in the SMD 106 until the user 402 sends a request to the SMD 106 for manipulating the stored electronic document. In one embodiment, the user 402 may send the request to the SMD 106 at the SMD 106 via a suitable user interface such as those mentioned above. At step G, the user 402 may access the stored electronic document on the user interface of the SMD 106 and marks a page and a position on the electronic document where the digital signature is to be placed. In order to perform such marking, the intended page and position of the electronic document may be accessed on the SMD user interface, or the SMD 106 may be configured to display on the SMD user interface a list of pages and positions that may be selected by the user 402 for embedding the digital signature on the electronic document.

At step H, the user 402 may access the secure folder where the digital signature is located by entering the PIN on the user interface of the SMD 106 via the input device 112 such as a keyboard, a microphone, etc. The PIN may be numeric, alphanumeric, audio, video, biometric, or any combination thereof, in nature. In the secure folder, the user 402 may select a digital signature to be embedded on the electronic document. In some embodiments, the digital signature may be stored on the input device 112, such as a smart card. The user 402 may operate the input device 112 to communicate the stored digital signature to the SMD 106, where the digital signature may be received and selected for being embedded on the electronic document. At step I, the SMD 106 places the selected digital signature on the accessed or selected page and position of the electronic document based on a preselected or dynamically selected algorithm, for example, the hashing algorithm, stored in the SMD 106. In one embodiment, the SMD 106 is configured to compute a hash value of the document content including the digital signature. The computed hash value along with the hashing algorithm may also be placed with the digital signature on the electronic document to generate a signed electronic document. Optionally, the SMD 106 may compare the computed hash value with the hash data that was stored with the digital signature in the secure folder at the SMD 106. The SMD 106 confirms document integrity when the computed hash value is equivalent to the hash data for generating a signature certificate that may be integrated with the embedded digital signature to indicate authenticity of the digital signature.

At step J, the user 402 may operate the input device 112 to communicate with the SMD 106, for example, by swiping the smartcard against the card reader at the SMD 106. The input device 112 may include a unique private key and a reference to the encryption algorithm that are to be used and selected respectively for encrypting the signed electronic document. At step K, the SMD 106 may encrypt the signed electronic document using the unique private key based on the encryption algorithm referred to in the input device 112 for generating an encrypted signed document. At step L, the SMD 106 may transmit the encrypted signed document to the destination address corresponding to the receiver device 104. The destination address may be received by the SMD 106 from at least one of the sender device 102, the input device 112, and the user 402 entering the destination address directly at the SMD 106 via the SMD user interface. In some embodiments, the destination address may be preconfigured into the SMD 106. Steps A to I may be repeated with multiple users for embedding multiple digital signatures on a single or multiple electronic documents at the SMD 106 without needing to print the electronic document. The encrypted signed electronic document may be decrypted by following the steps E-H of the workflow 200 discussed above.

Unlike traditional systems, embodiments of the present disclosure include the electronic documents and the document manipulation data being located on separate devices, which are isolated from each other. For example, the electronic documents may be located on a user device (e.g., the sender device 102 and the receiver device 104) and the document manipulation data may be located on the input device 112, which is not in communication with the user device. Such isolation prevents the document manipulation data from being inadvertently or erroneously exchanged with, or accessed without authorization by, the user device for manipulating the electronic documents.

The aforementioned operations and related operational workflows are exemplary in nature and should not be construed as functional limitations of the SMD 106. The SMD 106 may be configured to perform similar or other operations on the electronic documents as well as the physical documents 110 independently or in association with other devices or modules without any limitation.

The above description does not provide specific details of manufacture or design of the various components. Those of ordinary skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A system for manipulating an electronic document, the system for use with multiple user devices, the system comprising:
a multifunction device configured to receive the electronic document;
an input device configured to communicate document manipulation data to the multifunction device; and
a user device configured to communicate, over a network, an operation request and the electronic document to the multifunction device, the user device not being in communication with the input device;
wherein the multifunction device is configured to:
receive the operation request, the electronic document and the document manipulation data;
select, based on a first electronic input, the electronic document from a queue of electronic documents;
select, based on a second electronic input, a page from the electronic document;
embed at least one digital signature on the page selected from the electronic document using the document manipulation data based on the operation request;
encrypt the electronic document using a unique key received in the document manipulation data;
transmit the digitally signed electronic document, over the network, to a receiver multifunction device, wherein the receiver multifunction device is configured to receive and decrypt the electronic document.

2. The system of claim 1, wherein the input device communicates with the multifunction device via an interface device.

3. The system of claim 2, wherein the interface device is at least one of a biometric scanner, a card reader, an interactive display screen, or a combination thereof.

4. The system of claim 1, wherein the input device is at least one of a smartcard, a microphone, a stylus pen, a keyboard, a camera, or a combination thereof.

5. The system of claim 1, wherein the document manipulation data includes at least one of the unique key, an instance of a cryptographic algorithm, a destination address, or a digital signature.

6. The system of claim 5, wherein the unique key is at least one of numeric data, alphanumeric data, an audio signal, a video signal, biometric data, and any combination thereof.

7. The system of claim 1, wherein the multifunction device is configured to encrypt or decrypt the electronic document using the unique key.

8. The system of claim 1, wherein the multifunction device is configured to embed the electronic document with the at least one digital signature.

9. The system of claim 8, wherein the at least one digital signature may include an image, a text, a multimedia content, biometric data, or a combination thereof.

10. The system of claim 1, wherein the input device is located proximate to the multifunction device.

11. A method for operating a multifunction device in communication with multiple devices, the method comprising:
receiving, at the multifunction device over a network, an operation request and an electronic document from a first device;
receiving, at the multifunction device, document manipulation data from a second device;
selecting, based on a first electronic input, the electronic document from a queue of electronic documents;
selecting, based on a second electronic input, a page from the electronic document;
embedding at least one digital signature on the selected page of the electronic document using the document manipulation data based on the operation request;
encrypting the electronic document using a unique key received in the document manipulation data;

communicating the electronic document to a third device configured to receive and decrypt the electronic document, wherein the second device is isolated from the third device and the first device.

12. The method of claim 11, wherein the second device is in communication with an interface device for communicating with the multifunction device, the interface device not being in communication with the first device and the third device.

13. The method of claim 12, wherein the interface device is at least one of a biometric scanner, a card reader, an interactive display screen, or a combination thereof.

14. The method of claim 11, wherein the second device is at least one of a smartcard, a microphone, a stylus pen, a keyboard, a camera, or a combination thereof.

15. The method of claim 11, wherein the document manipulation data includes at least one of the unique key, an instance of a cryptographic algorithm, a destination address, or a digital signature.

16. The method of claim 15, wherein the unique key is at least one of numeric data, alphanumeric data, an audio signal, a video signal, biometric data, and any combination thereof.

17. The method of claim 11, wherein manipulating the electronic document includes encrypting or decrypting the electronic document using a unique key included in the document manipulation data.

18. The method of claim 11, wherein the embedding the electronic document with the at least one digital signature included in the document manipulation data includes embedding a digital image on a preselected position on the selected page of the electronic document.

19. The method of claim 11, wherein the at least one digital signature may include an image, a text, a multimedia content, biometric data, or a combination thereof.

20. The method of claim 11, further comprising placing the second device proximate to the multifunction device.

\* \* \* \* \*